(12) United States Patent
Yuan

(10) Patent No.: US 10,575,091 B2
(45) Date of Patent: Feb. 25, 2020

(54) METHOD, APPARATUS AND COMPUTER PROGRAM PRODUCT FOR AUDIO RECORDING

(71) Applicant: Lenovo (Beijing) Limited, Beijing (CN)

(72) Inventor: Bin Yuan, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/471,741

(22) Filed: Mar. 28, 2017

(65) Prior Publication Data
US 2017/0278539 A1 Sep. 28, 2017

(30) Foreign Application Priority Data

Mar. 28, 2016 (CN) .......................... 2016 1 0183070

(51) Int. Cl.
| | |
|---|---|
| *H04B 3/00* | (2006.01) |
| *H04R 3/00* | (2006.01) |
| *G06F 3/16* | (2006.01) |
| *H04R 1/10* | (2006.01) |

(52) U.S. Cl.
CPC .............. *H04R 3/00* (2013.01); *G06F 3/165* (2013.01); *H04R 1/1041* (2013.01); *H04R 2430/01* (2013.01)

(58) Field of Classification Search
CPC .... G11B 20/10527; G11B 2020/10555; G06F 3/165; H04R 1/1041; H04R 3/00; H04R 2420/05; H04R 2420/07; H04R 2430/01
USPC ... 381/309, 311, 26, 56, 59, 77, 85, 92, 110, 381/122, 123, 355, 373
See application file for complete search history.

(56) References Cited

U.S. PATENT DOCUMENTS

| | | | | |
|---|---|---|---|---|
| 6,744,882 B1* | 6/2004 | Gupta | ................. | H04M 1/6008 379/387.01 |
| 7,903,825 B1* | 3/2011 | Melanson | ................. | H03G 3/32 381/103 |
| 9,584,086 B2* | 2/2017 | McCollough | ............ | H03G 3/32 |
| 2002/0189429 A1* | 12/2002 | Qian | .................... | G10H 1/0041 84/610 |

(Continued)

FOREIGN PATENT DOCUMENTS

| | | |
|---|---|---|
| CN | 101243516 A | 8/2008 |
| CN | 102299694 A | 12/2011 |
| CN | 104978145 A | 10/2015 |

*Primary Examiner* — Norman Yu
(74) *Attorney, Agent, or Firm* — Kunzler Bean & Adamson

(57) ABSTRACT

A method, apparatus and computer program product are disclosed. The method includes acquiring an instruction, picking up an audio signal with an electronic device, determining whether an output apparatus is connected to the electronic device, outputting the audio signal via the output apparatus, and recording the audio signal. The apparatus includes a processor, an output apparatus, a microphone, and a storage apparatus, wherein the processor acquires an instruction, picks up an audio signal, determines whether the output apparatus is connected, outputs the audio signal via the output apparatus and records the audio signal to the storage medium. The computer program product includes executable code to perform acquisition of an instruction, pickup of an audio signal with an electronic device, a determination of whether an output apparatus is connected, output of the audio signal, and recording of the audio signal.

15 Claims, 9 Drawing Sheets

(56) References Cited

U.S. PATENT DOCUMENTS

2011/0268291 A1* 11/2011 Ha ....................... H04R 1/1041
                                                                             381/74
2017/0048609 A1* 2/2017 Schnell ................ H04R 1/1083
2017/0374184 A1* 12/2017 Kim .................... H04M 1/6066

* cited by examiner

METHOD, APPARATUS AND COMPUTER PROGRAM PRODUCT FOR AUDIO RECORDING

FIELD

The present disclosure relates to electronic technologies, and in particular, relates to a recording method and apparatus, and an electronic device thereof.

BACKGROUND

Electronic devices such as mobile phones, tablet computers and the like often include a microphone and a loudspeaker to conveniently perform audio recording and playback. However, the recording quality is often poor due to high noise levels and weak far-field recording signal, among other problems. Furthermore, a user cannot monitor the effect of the audio recording over the mobile phone in real time.

SUMMARY

Various embodiments of a method, apparatus and computer program product are disclosed.

The method comprises acquiring a trigger instruction; picking up an audio signal with a microphone of an electronic device in response to acquiring the trigger instruction; determining whether the electronic device is connected to an external audio output apparatus; outputting the audio signal in real time via the external audio output apparatus based on a first determination result; and recording the audio signal; wherein the first determination result indicates that the electronic device is connected to the external audio output apparatus.

The apparatus comprises a processor; an external audio output apparatus; a microphone; and a storage apparatus; wherein the processor acquires a trigger instruction, picks up an audio signal with the microphone in response to acquiring the trigger instruction, determines whether the apparatus is connected to the external audio output apparatus, outputs the audio signal in real time via the external audio output apparatus based on a first determination result, and records the audio signal to the storage apparatus; wherein the first determination result indicates that the apparatus is connected to the external audio output apparatus.

The computer program product comprises a computer readable storage medium that stores code executable by a processor, the executable code comprising code to perform: acquisition of a trigger instruction; pickup of an audio signal with a microphone of an electronic device in response to acquiring the trigger instruction; a determination of whether the electronic device is connected to an external audio output apparatus; output of the audio signal in real time via the external audio output apparatus based on a first determination result; and recording of the audio signal; wherein the first determination result indicates whether the electronic device is connected to the external audio output apparatus.

BRIEF DESCRIPTION OF THE DRAWINGS

The foregoing and other objects, features and advantages of the present disclosure will become more apparent from the detailed descriptions of the embodiments of the present disclosure in conjunction with the drawings. The drawings are used to provide a further understanding of the embodiments of the present disclosure and constitute a part of the Description, which, together with the embodiments of the present disclosure, serve to explain the present disclosure and are not construed as a limitation to the present disclosure. Unless explicitly indicated, the drawings should not be understood as being drawn to scale. In the drawings, the same reference numerals generally represent the same components or steps. In the drawings.

DETAILED DESCRIPTION

The technical solutions of the present disclosure are further described in detail with reference to attached drawings and specific embodiments. The embodiments provided herein are exemplary in nature, rather than limiting.

Embodiment 1 will now be described.

To solve the current technical problem, one embodiment of the present disclosure provides an audio recording method. The audio recording method is applied to an electronic device, and the functions implemented by the method may be practiced by means of a processor of the electronic device calling program code. Furthermore, the program code may be stored in a computer storage medium. Hence, the electronic device at least comprises a processor and a storage medium.

The electronic device may be any of various devices capable of processing information. For example, the electronic device may comprise a mobile phone, a tablet computer, a desktop computer, a personal digital assistant, a navigator, a digital telephone, a video telephone, a television or the like. The electronic device according to the embodiment of the present disclosure is preferably a mobile electronic device, for example, a mobile phone, a tablet computer or the like device.

Figure 1:
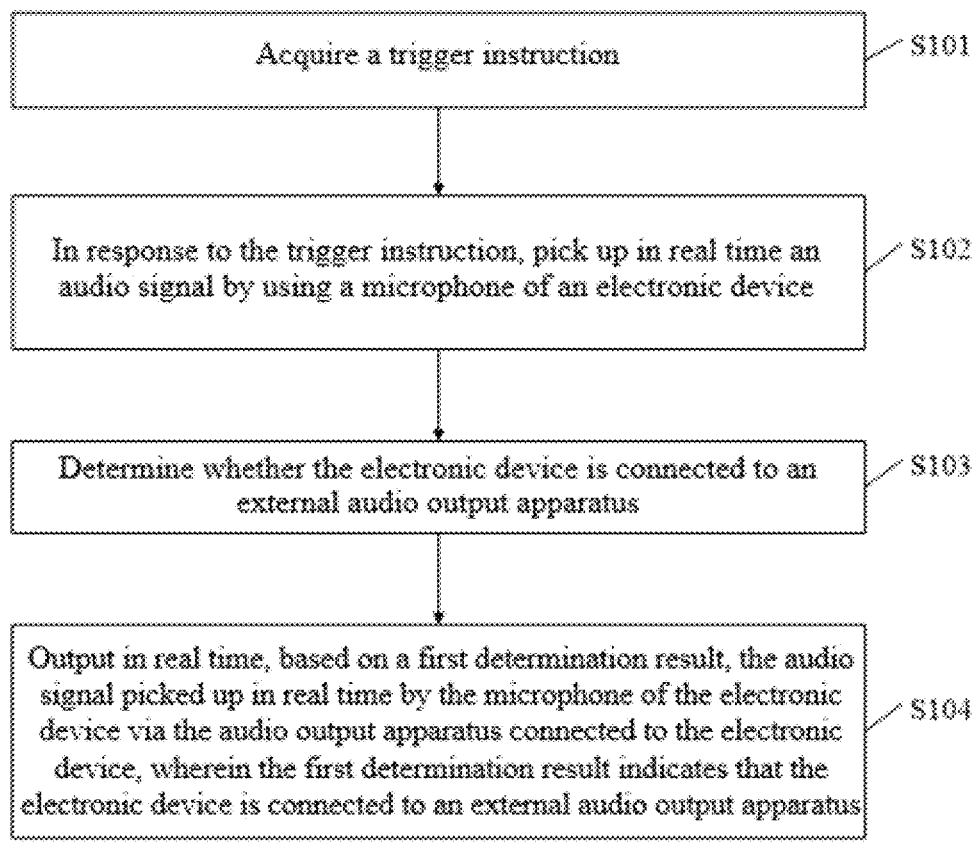
FIG. 1 is a schematic flow diagram of one embodiment of an audio recording method.

FIG. 1 is a schematic flow diagram of one embodiment of an audio recording method. As illustrated in FIG. 1, the method comprises the following steps S101, S102, S103, and S104.

In Step S101, a trigger instruction is acquired.

Herein, the trigger instruction is used for triggering the electronic device to perform audio recording. That is, the microphone of the electronic device picks up audio signals. The trigger instruction obtained in step S101 may be a trigger instruction generated by a trigger operation performed by the user, or may be a trigger instruction generated by detecting one or more predefined conditions. For example, when the user needs to record audio (for example, in a lecture), the user may trigger the electronic device to generate a trigger instruction.

The trigger operation may also be performed by software or hardware. For example, audio recording software may be installed on a mobile phone, and when audio recording is needed, the user opens the audio recording software (a first operation), and the electronic device then acquires the trigger instruction by detecting the first operation.

As another example, a trigger zone or a trigger key may be defined on the electronic device, and when the user taps the trigger zone or press the trigger key, the electronic device may generate a trigger instruction. In some embodiments, by long-pressing the volume key over 3 seconds, the electronic device is triggered to generate a trigger instruction. Nevertheless, in other embodiments of the present disclosure, the user may input an audio signal or the like to the electronic device such that the electronic device generates a trigger instruction. For example, if the user says "start audio recording", the electronic device may generate a trigger instruction.

In Step S102, in response to the trigger instruction, an audio signal is picked up in real time by using a microphone of an electronic device.

In some embodiments, the method further comprises: caching, in real time, the audio signal picked up by the microphone to a storage apparatus of the electronic device. In a preferred embodiment, the electronic device caches in real time the audio signal picked up by the microphone to a memory of the electronic device.

In Step S103 it is determined whether the electronic device is connected to an external audio output apparatus.

In some embodiments, the electronic device and the external audio output apparatus may be connected to each other in a wired manner or a wireless manner. In some embodiments, the external audio output apparatus may be an earphone, headphones or other electronic device. In some embodiments, the other electronic device may be another mobile phone, a smart phone, a smart watch or other device capable of outputting audio signals. In some embodiments, the earphone comprises a common wired earphone, a wireless earphone such as a Bluetooth earphone, or a line-controlled earphone. In a preferred embodiment, the external audio output apparatus is a line-controlled earphone.

In Step S104, the audio signal picked up in real time by the microphone of the electronic device is output in real time based on a first determination result via the audio output apparatus connected to the electronic device, wherein the first determination result indicates that the electronic device is connected to an external audio output apparatus.

In some embodiments, step S101 and step S102 are subject to a time sequence. That is, step S101 is performed first and then step S102 is performed. However, step S103 and step S101 are subject to no strict time sequence; that is, step S101 may be performed first and then step S103 may be performed, or step S103 may be performed first and then step S101 may be performed.

In some embodiments, when the external audio output apparatus is a wired earphone, step S103 may comprise: judging, by the electronic device, whether an earphone plug thereof is inserted with an earphone; if an earphone plug thereof is inserted with an earphone, obtaining a first determination result, and if the earphone plug thereof is inserted with no earphone, obtaining a second determination result; wherein the first determination result indicates that the electronic device is connected to an external audio output apparatus, and the second determination result indicates that the electronic device is not connected to an external audio output apparatus.

In some embodiments: a trigger instruction is received, and in response to the trigger instruction, an audio signal is picked up in real time by using a microphone of an electronic device; it is determined whether the electronic device is connected to an external audio output apparatus; and the audio signal picked up in real time by the microphone of the electronic device is output in real time, based on a first determination result, via the audio output apparatus connected to the electronic device, wherein the first determination result indicates that the electronic device is connected to an external audio output apparatus. Thus, audio recording by the electronic device may be monitored in real time, and thus the audio recording effect is improved.

Embodiment 2 will now be described.

Another embodiment of the present disclosure provides an audio recording method, wherein the method comprises the following steps S201, S202, S203, and S204, In step S201, a trigger instruction is acquired.

In step S202, and in response to the trigger instruction, an audio signal is picked up in real time by using a microphone of an electronic device.

In step S203 it is determined whether the electronic device is connected to an external audio output apparatus.

In step S204, the audio signal picked up in real time by the microphone of the electronic device is output based on the first determination result via the external audio output apparatus connected to the electronic device, and an internal audio output apparatus of the electronic device is prohibited from outputting in real time the audio signal picked up by the microphone; wherein the first determination result indicates that the electronic device is connected to an external audio output apparatus.

In some embodiments, prohibiting an internal audio output apparatus of the electronic device from outputting in real time the audio signal picked up in real time by the microphone comprises: prohibiting an internal loudspeaker of the electronic device from outputting in real time the audio signal picked up in real time by the microphone, or controlling the audio signal not to be output in real time via an internal loudspeaker according to a control policy.

A third embodiment, Embodiment 3, will now be described.

Another embodiment of the present disclosure provides an audio recording method, wherein the method comprises the following steps S301, S302, S303, S304 and S305.

In step S301 a trigger instruction is acquired.

In step S302, in response to the trigger instruction, an audio signal is picked up in real time by using a microphone of an electronic device.

In step S303 it is determined whether the electronic device is connected to an external audio output apparatus.

In step S304, the audio signal picked up in real time by the microphone of the electronic device is output in real time based on a first determination result via the audio output apparatus connected to the electronic device, wherein the first determination result indicates that the electronic device is connected to an external audio output apparatus.

In step S305, an internal audio output apparatus of the electronic device is prohibited, based on a second determination result, from outputting in real time the audio signal picked up by the microphone, wherein the second determination result indicates that the electronic device is not connected to an external audio output apparatus.

In some embodiments, step S301 to step S304 respectively correspond to step S101 to step S104 in Embodiment 1. Therefore, a person skilled in the art may refer to Embodiment 1 to understand step S301 to step S304. For brevity of description, such details are not described herein any further.

In some embodiments, the outputting in real time, based on a first determination result, the audio signal picked up in real time by the microphone of the electronic device via the audio output apparatus connected to the electronic device in step S304 comprises: outputting, based on the first determination result, the audio signal picked up in real time by the microphone of the electronic device via the external audio output apparatus connected to the electronic device, and prohibiting an internal audio output apparatus of the electronic device from outputting in real time the audio signal picked up in real time by the microphone.

Embodiment 4 will now be described.

This embodiment of the present disclosure is different from Embodiment 1 in that the external audio output apparatus further comprises a microphone. For example, a line-controlled earphone generally comprises an earphone, and a Bluetooth earphone generally comprises a microphone. Other electronic devices may also comprise a microphone. In this case, this embodiment of the present disclosure further provides an audio recording method. The method comprises the following steps S401, S402, S403, S404 and S405.

In step S401 a trigger instruction is acquired.

In step S402, in response to the trigger instruction, an audio signal is picked up in real time by using a microphone of an electronic device.

In step S403 it is determined whether the electronic device is connected to an external audio output apparatus.

In step S404, the audio signal picked up in real time by the microphone of the electronic device is output, based on the first determination result, via the external audio output apparatus connected to the electronic device. Step S404 also includes prohibiting an internal audio output apparatus of the electronic device from outputting in real time the audio signal picked up by the microphone.

In step S405 the microphone of the external audio output apparatus is prohibited, via control, from picking up the audio signal.

Herein, the microphone of the external audio output apparatus is prohibited from picking up the audio signal in at least two manners. One manner is done by directly prohibiting the microphone of the external audio output apparatus from picking up the audio signal. For example, the microphone on an earphone may not be permitted to pick up the audio signal. The other manner involves prohibiting the microphone of the external audio output apparatus from picking up the audio signal according to a control policy.

Embodiment 5 will now be described.

Electronic devices such as mobile phones, tablet computers and the like are often integrated with a microphone and a loudspeaker, such that audio recording may be performed and an audio file may be played anytime and anywhere. For example, mobile phones are increasingly used for audio recording. Generally speaking, it is convenient to perform audio recording by using a mobile phone but the recording quality is poor. The major problems lie in high noise levels and weak recording signals of far-field recording.

Generally, audio recording may be categorized into high-definition audio recording and directed audio recording. The contradiction between the microphone gain and the low noise also needs to be addressed. Generally, a plurality of microphones are used to implement beamforming and achieve far-field directed audio recording. Simple applications (Apps) are installed on the interface of the mobile phone, and a user interface (UI) only provides functions such as starting audio recording, pausing audio recording and playing audio data and the like.

This solution is defective in that the far-field audio recording does not address the contradiction between gain and the low noise. Generally speaking, and according to the flexibility of the market available microphone, the gain of the microphone needs to be set to be higher. However, by doing so, the low noise of the microphone would increase accordingly. In the related art, directing rather than positioning may be implemented when the mobile phone is used to perform audio recording. When the positions of an audio recorder and the recording subject are changed (for example, changed from a far place to a near place), and the microphone still uses the same gain, distortion and low volume may occur. In addition, in a scenario where the mobile phone is used as a meeting recorder or for recording classes, operational requirements would be imposed on the mobile phone. For example, it is better that the mobile phone to be arranged far away from the audio recorder but proximal to the speaker, which requires that the mobile phone supports long distance operation. The user needs to conveniently start audio recording, pause audio recording, end audio recording and create audio recording. In a case of long-time audio recording, markers need to be made conveniently, such that it is convenient for the user to select a segment subsequently to listen to and reorganize the audio segments.

Figure 2:
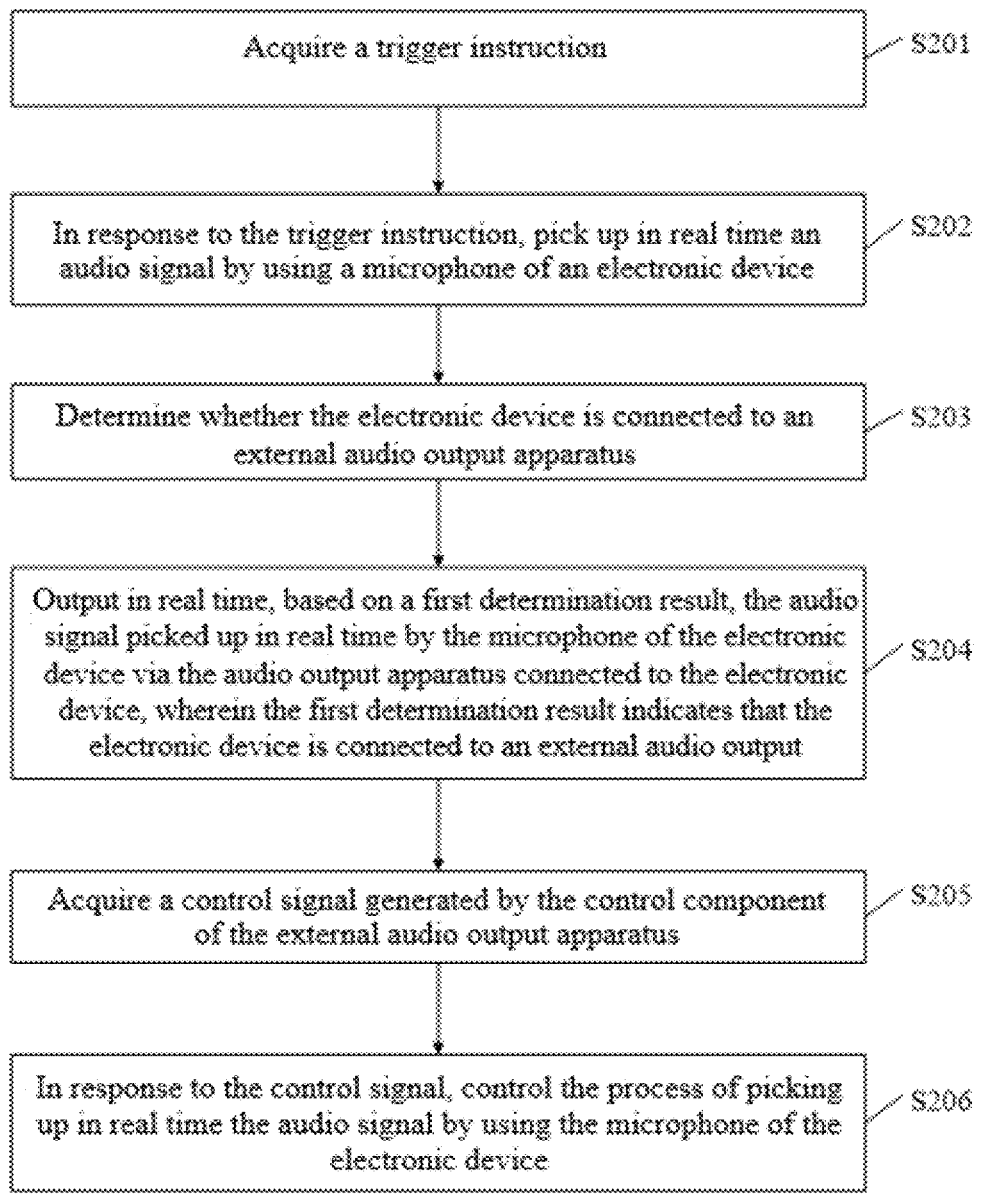
FIG. 2 is a schematic flow diagram of one embodiment of an audio recording method according to Embodiment 5 of the present disclosure.

To solve the above technical problem, in the embodiment of the present disclosure, the external audio output apparatus further comprises a control component. For example, when the external audio output apparatus is a line-controlled earphone, the control component may be a Hook Key of the line-controlled earphone. When the external audio output apparatus is, for example, another mobile phone, the control component may be an input apparatus of the mobile phone. When the external audio output apparatus includes, for example, a Bluetooth earphone, the control component may be a control button of the Bluetooth earphone. In the embodiment of the present disclosure, the audio recording process of the electronic device is controlled in real time by using the control component of the external audio output apparatus. Based on such disclosure, this embodiment of the present disclosure provides an audio recording method. FIG. 2 is a flow diagram of an audio recording method according to Embodiment 5 of the present disclosure. As illustrated in FIG. 2, the method comprises the following steps S201, S202, S203, S204, S205 and S206:

In Step S201, a trigger instruction is acquired.

In Step S202, in response to the trigger instruction, an audio signal is picked up in real time by using a microphone of an electronic device.

In Step S203 it is determined whether the electronic device is connected to an external audio output apparatus.

In Step S204 the audio signal picked up in real time by the microphone of the electronic device is output in real time based on a first determination result via the audio output apparatus connected to the electronic device, wherein the first determination result indicates that the electronic device is connected to an external audio output apparatus.

In Step S205 a control signal generated by the control component of the external audio output apparatus is acquired.

In Step S206, in response to the control signal, the process of picking up in real time the audio signal by using the microphone of the electronic device is controlled.

In some embodiments, controlling the process of picking up in real time the audio signal by using the microphone of the electronic device comprises:

performing gain adjustment on the process of picking up in real time the audio signal by using the microphone of the electronic device.

Embodiment 6 will now be described.

Electronic devices such as mobile phones, tablet computers and the like are integrated with a microphone and a loudspeaker, to record and play audio. Mobile phones are increasingly used for audio recording. However, the recording quality is often poor. The major problems lie high noise levels and weak signals for far-field recording. Audio recording may be categorized into high-definition audio recording and directed audio recording. In particular, in a case of long duration audio recording, marks need to be made during the audio recording process (sometimes through a mark operation, that is, making a mark or marks), to conveniently navigate within the audio file.

However, in the related art, no marker can be made during audio recording by using a mobile phone, unlike scenarios where a dedicated professional audio recording device is used. In addition, in a scenario where the mobile phone is used as a meeting recorder or to record classes, operational requirements would be imposed on the mobile phone. For example, it is better that the mobile phone to be arranged far away from the audio recorder but proximal to the speaker, which requires that the mobile phone supports long distance operation. The user needs to conveniently start, pause and end audio recording, along with creating the audio file and other operations. In a case of long-time audio recording, a mark also needs to be conveniently made, such that it is convenient for the user to select a segment subsequently to listen and intercept and reorganize the audio segments.

To solve the above technical problem, in the embodiment of the present disclosure, the external audio output apparatus further comprises a control component. For example, when the external audio output apparatus is, a line-controlled earphone, the control component may be a Hook Key of the line-controlled earphone; when the external audio output apparatus is, for example, another mobile phone, the control component may be an input apparatus of the mobile phone; and when the external audio output apparatus is, for example, a Bluetooth earphone, the control component may be a control button of the Bluetooth earphone. In the embodiment of the present disclosure, the functions of starting audio recording, pausing audio recording, ending audio recording, creating the audio recording file and making marks are defined by using the Hook Key.

Figure 3:
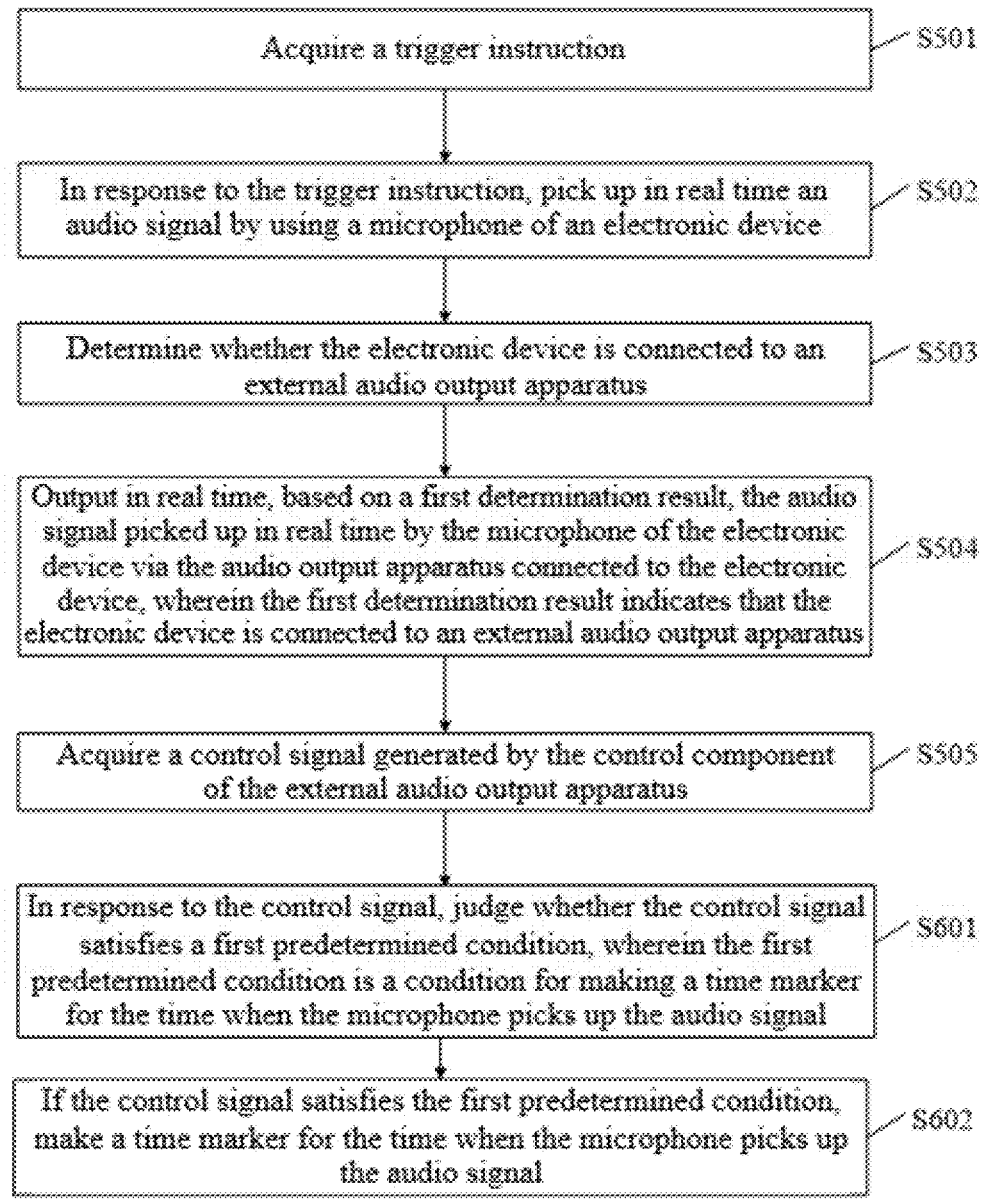
FIG. 3 is a first schematic flow diagram of one embodiment of an audio recording method.

In addition, during recordings of longer durations, a gray screen operation may be defined, and the Hook Key may be defined to perform a one-click operation of directly unlocking the screen and starting audio recording and the like. Based on this disclosure, this embodiment of the present disclosure provides an audio recording method. FIG. 3 is a first schematic flow diagram of an audio recording method according to Embodiment 6 of the present disclosure. As illustrated in FIG. 3, the method comprises the following steps:

In step S501, a trigger instruction is acquired.

In step S502, in response to the trigger instruction, an audio signal is picked up in real time by using a microphone of an electronic device.

In step S503 it is determined whether the electronic device is connected to an external audio output apparatus.

In step S504, the audio signal picked up in real time by the microphone of the electronic device is output in real time based on a first determination result via the audio output apparatus connected to the electronic device, wherein the first determination result indicates that the electronic device is connected to an external audio output apparatus.

In step S505 a control signal generated by the control component of the external audio output apparatus is acquired.

Steps S601 and S602 provide a manner of implementation for step S506 in Embodiment 5.

In Step 601, in response to the control signal, it is judged whether the control signal satisfies a first predetermined condition, wherein the first predetermined condition is a condition for making a time marker for the time when the microphone picks up the audio signal.

In step S602, if the control signal satisfies the first predetermined condition, a time marker is made for the time when the microphone picks up the audio signal.

Figure 4:
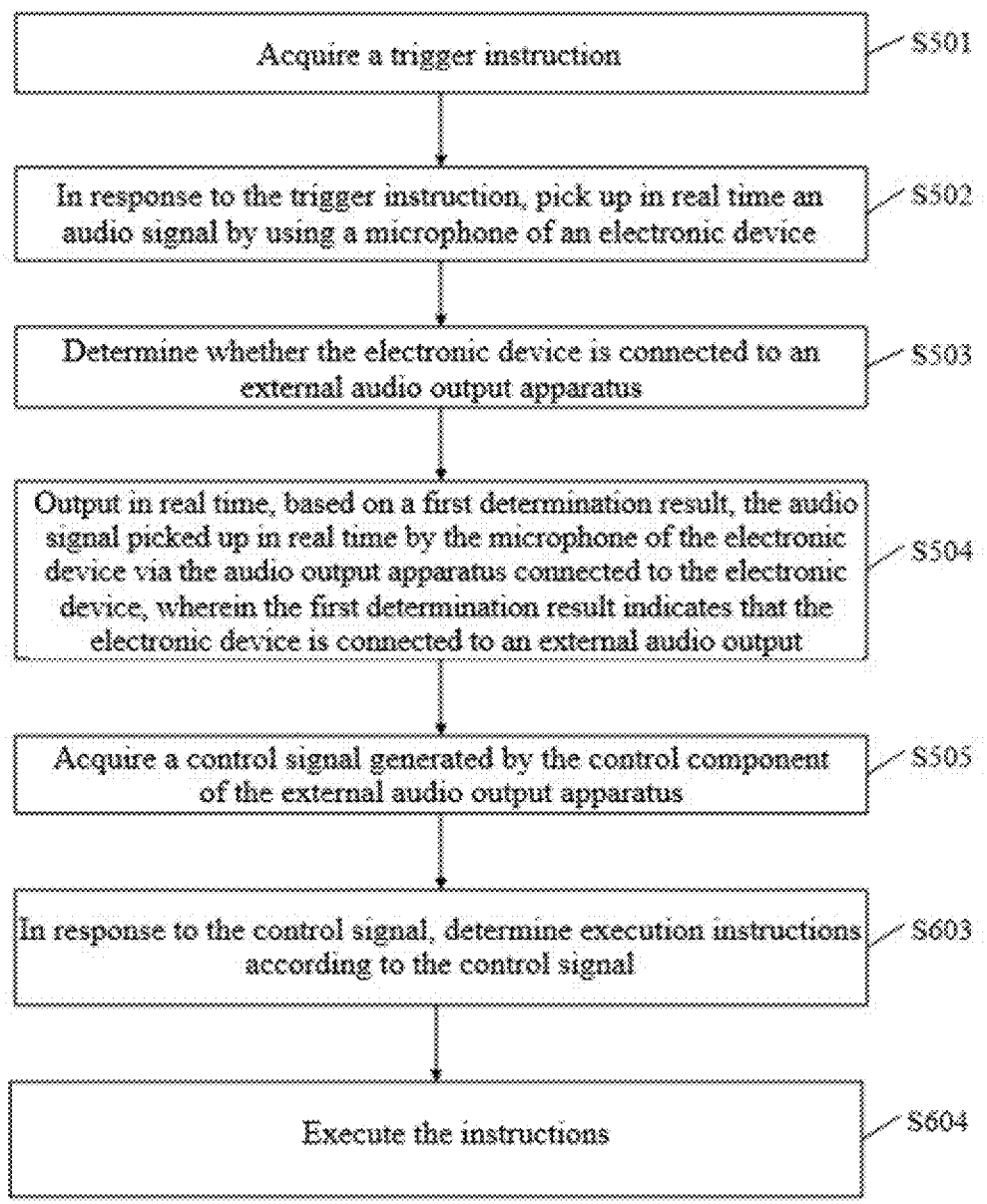
FIG. 4 is a second schematic flow diagram of the embodiment of an audio recording method depicted in FIG. 3.

FIG. 4 is a second schematic flow diagram of the embodiment of an audio recording method depicted in FIG. 3. As illustrated in FIG. 4, the method comprises the following steps S501, S502, S503, S504, S505, S603, and S604.

In step S501 a trigger instruction is acquired.

In step S502, in response to the trigger instruction, an audio signal is picked up in real time by using a microphone of an electronic device.

In step S503 it is determined whether the electronic device is connected to an external audio output apparatus.

In step S504 the audio signal picked up in real time by the microphone of the electronic device is output in real time based on a first determination result via the audio output apparatus connected to the electronic device, wherein the first determination result indicates that the electronic device is connected to an external audio output apparatus.

In step S505, a control signal generated by the control component of the external audio output apparatus is acquired.

In step S603, in response to the control signal, execution instructions are determined according to the control signal, wherein the execution instructions at least comprise an instruction for storing the audio signal picked up in real time by the microphone to a storage apparatus of the electronic device, an instruction for starting to control real-time pickup of the audio signal by the microphone, an instruction for pausing real-time pickup of the audio signal by the microphone, and an instruction for stopping real-time pickup of the audio signal by the microphone.

In step S604 the instructions are executed.

In some embodiments, in response to the control signal, determining execution instructions according to the control signal in step S603 comprises: receiving, with the electronic device, the control signal sent by the external audio output apparatus; parsing, with the electronic device, the control signal to obtain a parse value; and determining, with the electronic device, the execution instructions according to the parse value.

Parsing, with the electronic device, the control signal to obtain a parse value may comprise: determining, by the electronic device, the type of the control signal and the key type corresponding to the control signal; and determining, with the electronic device, the type of the control signal and the type of the key to thus determine the parse value of the control signal.

Determining, with the electronic device, the execution instructions according to the parse value may comprise: querying, by the electronic device, predetermined association information according to the parse value to obtain the execution instructions, wherein the association information is used for indicating a corresponding relationship between the parse value and the execution instructions.

Steps S603 and S604 provide a manner of implementation for step S506 in Embodiment 5.

The following description is given using a line-controlled earphone as an example. In this embodiment, with respect to the problems of gain and noise of the microphone for audio recording, a solution involving real time monitoring of the audio recording and real time control of the audio recording process is proposed. This solution mainly includes: breaking through the channel from the microphone of the mobile phone to the external audio output apparatus, (for example, a line-controlled earphone by using hardware); during audio recording, inserting a line-controlled earphone equipped with the Hook Key; and during the course of audio recording, using the microphone (which acts as a primary microphone) of the mobile phone for audio recording, and using the loudspeaker of the earphone in monitoring the audio recording; wherein the microphone of the earphone is not used for audio recording and is thus shielded (muted or disabled).

The Hook Key is linked with the functions of starting, pausing and ending audio recording, and the volume adjustment keys on the earphone wire are linked with the function of adjusting the gain of the audio recording. As such, when the user inserts and wears a line-controlled earphone, during audio recording, he or she may adjust the gain of the microphone according to the volume for audio recording monitored in real time and the practical noise, to effectively adjust the audio recording effect in real time.

Figure 5:
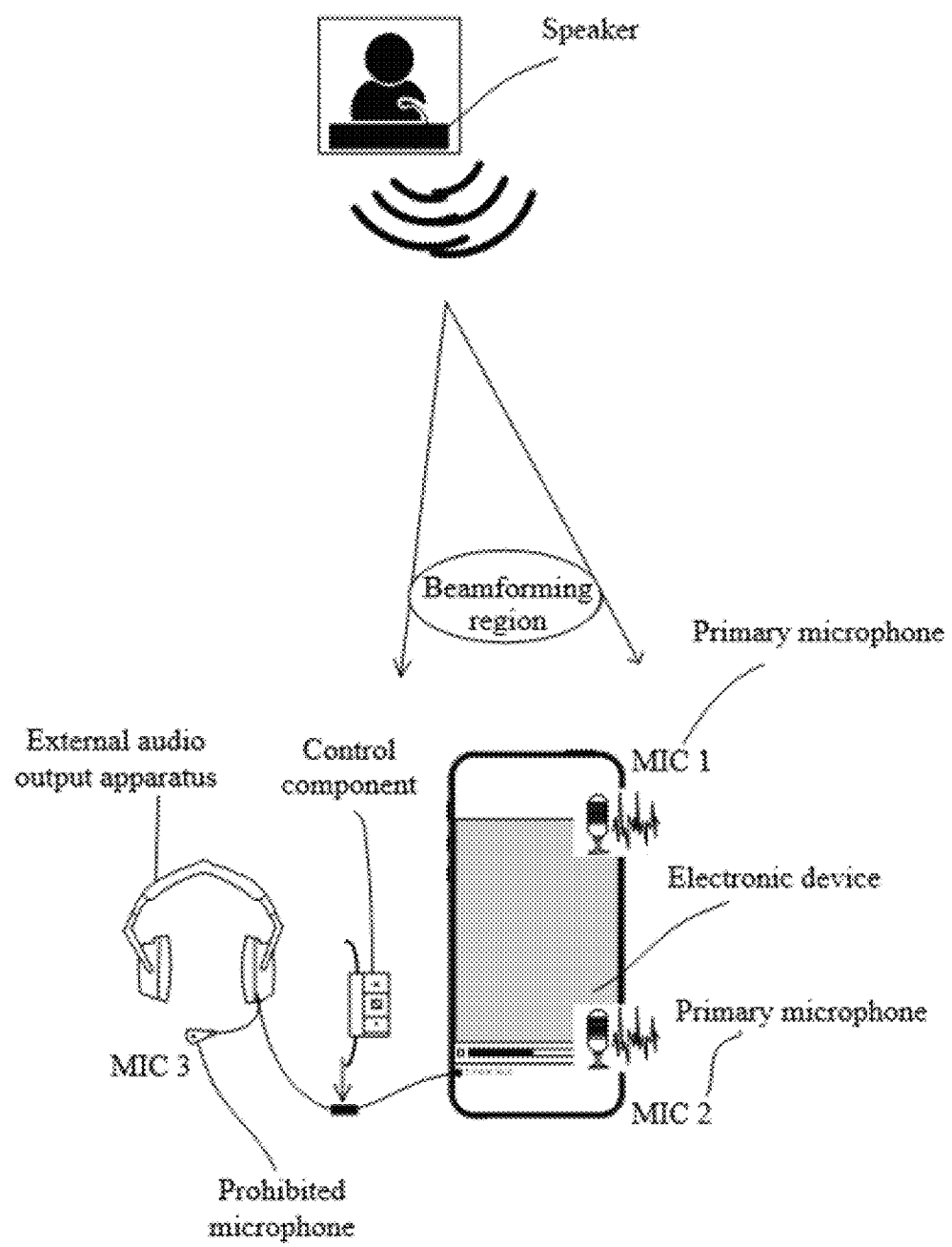
FIG. 5 is a schematic diagram of a scenario according to the embodiments of the present disclosure.

In addition, the functions of starting, pausing and ending and storing audio recording are accomplished by using the functions defined by the Hook Key. For example, as illustrated in FIG. 5, the user may listen to the recorded audio data while recording. When the speaker is near the user (the audio recording device being the electronic device in the embodiment of the present disclosure), the gain is lowered, and when the speaker is far away from the audio recording device, the gain needs to be increased. In some embodiments, increasing and decreasing the gain may be implemented by using the Hook Key on the line-controlled earphone. For example, reference may be made to Table 1 for the functions defined on the Hook Key.

TABLE 1

| Key name | Defined function |
| --- | --- |
| Click the middle key | Start audio recording |
| Double-click the middle key | Start marking the audio recording to make a time marker |
| Double-click the middle key again | Start marking the audio recording to end a time marker. |
| Click the middle key further again | End audio recording |
| Press volume key + | Improve the analog gain during audio recording |
| Press volume key − | Lower the analog gain during audio recording |

Some of the advantages that may be achieved through the technical solution of the embodiment of the present disclosure include: 1) The audio recording course may be monitored in real time, and when the speaker's volume or position changes, the gain of the microphone may be adjusted for compensation; and this function may be controlled by means of operating the line control on the earphone wire; 2) The mobile phone may be disposed to a position distal from the audio recorder by using the earphone wire, which increases the effective audio recording distance; in such a case, interference may be eliminated, and additionally audio signals are more conveniently picked up by the microphone; 3) The Hook Key button may be conveniently operated, and interruption definitions may be set for the Hook Key during the specific implementation process, such as short-press, long-press, one-press, double-press, to define functions of the mobile phone such as starting, pausing, ending, restarting audio recording and the like.

For clearer description of this embodiment, hereinafter a line-controlled earphone is used as an example. In this embodiment, based on the related art, a line-controlled earphone is added to implement control (that is, by sending some control signals by using the line-controlled earphone) of the audio recording process of the audio recording device (that is, the electronic device). With the above technical solution, the electronic device according to the embodiment of the present disclosure may have some of the functions of a professional audio recording device, including: 1) adjustable analog microphone gain (either manually or automatically) and real-time monitoring thereof; and 2) providing an earphone plug so that an earphone may be inserted into the plug and audio recording may be monitored in real time.

Figure 6:
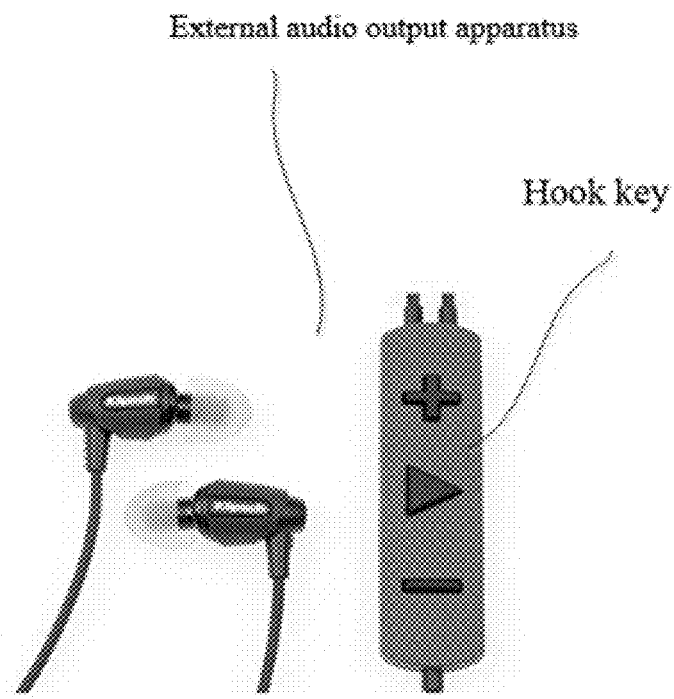
FIG. 6 is a schematic diagram of one embodiment of a control component on an external audio output apparatus.

In the embodiment of the present disclosure, considering that an electronic device such as a mobile phone is not provided with a dedicated knob for adjustments, this embodiment may use an external audio output apparatus, for example, a line-controlled earphone (for example, as illustrated in FIG. 5 and FIG. 6) to directly control the gain of the microphone by using the volume increase key (+) and the volume decrease key (−). The volume increase key (+), the volume decrease key (−) and the play key collectively form the Hook Key. When the Hook Key is pressed down, an interruption may be caused. The interruption signals may be used to define triggering of some functions (for example, increasing the gain, and decreasing the gain). In addition, the audio recording may be monitored in real time while the user is wearing the earphone (and, therefore, the signal from the microphone must pass to the earphone), and the user may press down the Hook Key to adjust the gain of the microphone based on the signal monitored in real time.

Figure 7:
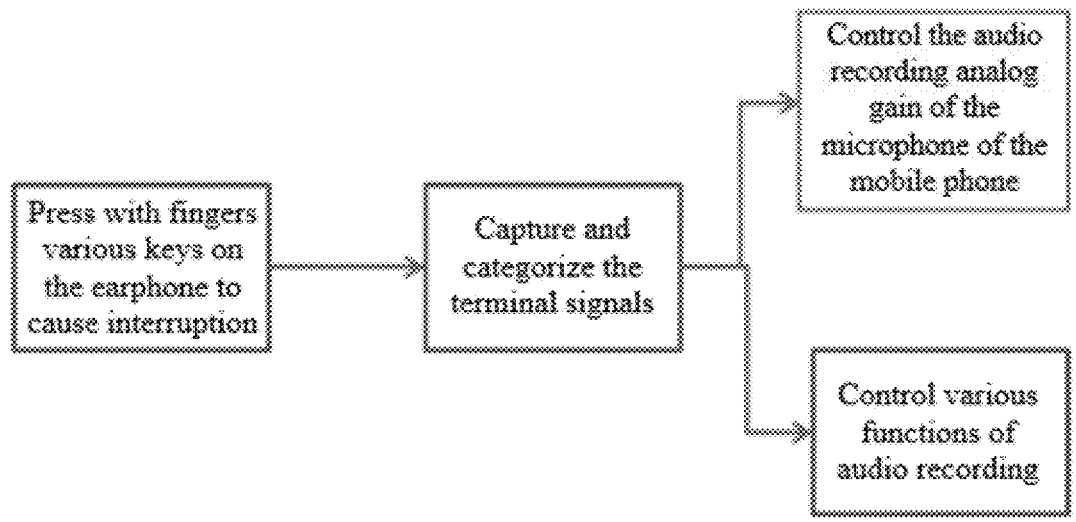
FIG. 7 is a schematic flow diagram of one embodiment of controlling an electronic device to implement audio recording by using a line control earphone.

The Hook Key on the line-controlled earphone is used to generate an interruption signal, and this interruption response may be programmed to call and control some functions. For example, in this embodiment, description is given by using the definitions of the functions as listed in Table 1 and using a three-key line-controlled earphone as an example. During use, as illustrated in FIG. 7, the user presses down the keys on the line-controlled earphone and generates interruption signals, after which the electronic device captures and categorizes the terminal signals. The electronic device then controls the audio recording gain of the primary microphone or implements other functions, such as, making a mark, pausing, starting and ending audio recording and the like.

Figure 8:
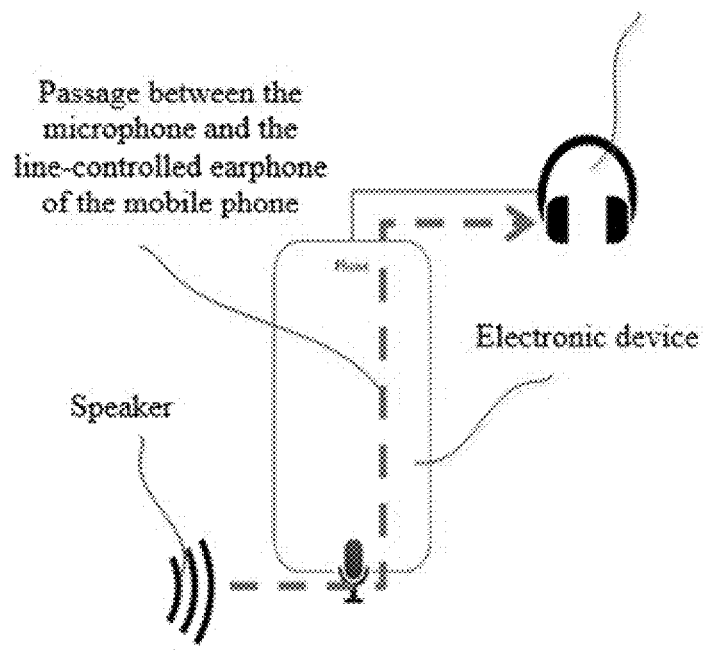
FIG. 8 is a schematic diagram of one embodiment of a process of surveillance audio recording.
Figure 9:
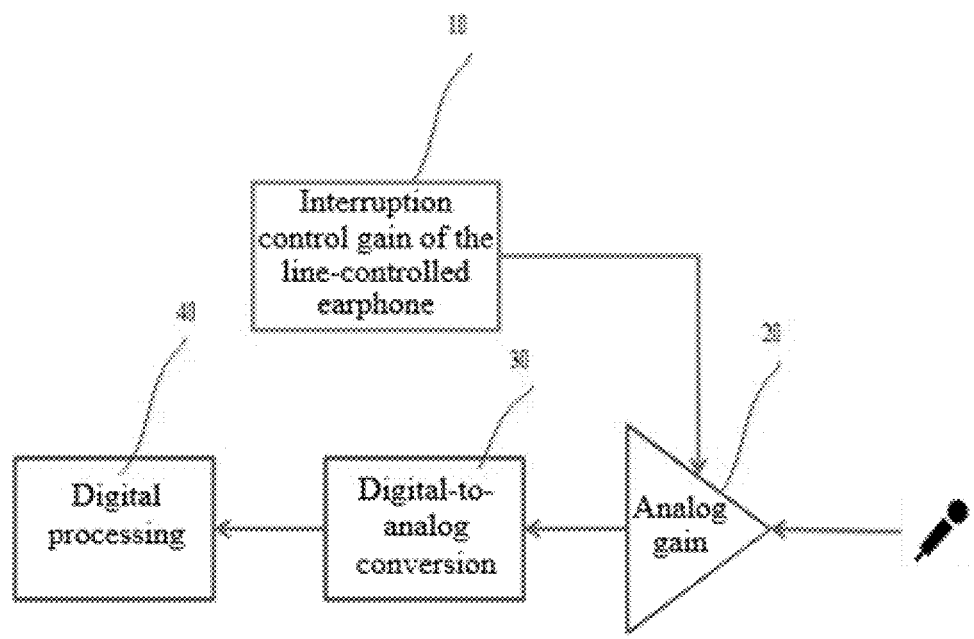
FIG. 9 is a schematic diagram of one embodiment of a process of adjusting gain.

It should be noted that in different embodiments, the gain of the microphone may be adjusted based on the practical volume and noise during the audio recording. In a preferred embodiment, the user may wear the line-controlled earphone, and which is inserted into the mobile phone to enter the audio recording state. Two conditions need to be satisfied to implement this function. As illustrated in FIG. 8, condition A is that the signal between the microphone and the line-controlled earphone is opened, and during the audio recording the user is capable of sensing the effect of the real-time audio recording. Condition B is that the key functions of the line-controlled earphone must be defined to increase the analog gain of the microphone. As illustrated in FIG. 9, in some embodiments the process of adjusting the gain includes: 1) the user generating an interruption signal for increasing or decreasing the gain of the microphone; 2) the interruption being defined to increase the analog gain; 3) digital-to-analog conversion; and 4) digital processing.

With respect to audio recording for longer durations, marks need to be made while audio recording. Based on the above description of the functions, the user wears the earphone to monitor the audio recording in real time, and when a mark is needed, the user presses down the line-controlled key on the earphone and records the current audio recording time point by using the definition of the line-controlled key. In the embodiment of the present disclosure, the distance between the speaker and the mobile phone is mainly sensed by the user. Nevertheless, the mobile phone may automatically sense the distance between the mobile phone and the speaker.

Embodiment 7 will now be described.

Based on the above embodiments, this embodiment of the present disclosure further provides an audio recording method, wherein the method comprises the following steps S701, S702, S703, S704, S705, S706, S707 and S708.

In step S701 a trigger instruction is acquired.

In step S702, in response to the trigger instruction, an audio signal is picked up in real time by using a microphone of an electronic device.

In step S703 it is determined whether the electronic device is connected to an external audio output apparatus.

In Step S704 the audio signal picked up in real time by the microphone of the electronic device is output in real time based on a first determination result via the audio output apparatus connected to the electronic device, wherein the first determination result indicates that the electronic device is connected to an external audio output apparatus.

In Step S705 a parameter value of the audio signal picked up in real time by the microphone is acquired.

The parameter value may be an amplitude (or volume) parameter of the audio. For example, when the electronic device detects that the currently picked up audio signals (the collected audio signals) are played at a low volume, the electronic device increases the gain of the microphone, and when the electronic device detects that the current volume is high, the electronic device decreases the gain of the microphone.

In step S706 it is judged whether the parameter value of the audio signal picked up in real time by the microphone satisfies a second predetermined condition to acquire a judgment result.

In some embodiments, the second predetermined condition may be a threshold or may be a range. For example, it may be judged whether the current parameter is greater than a threshold, if the current parameter is less than a first threshold, the gain is increased; if the current parameter value is greater than a second threshold, the gain is lowered, and if the current parameter value is between the first threshold and the second threshold, no processing is performed. The first threshold is less than the second threshold.

In step S707 a gain value is determined according to the judgment result.

In step S708 a gain of the audio signal picked up in real time by the microphone is adjusted according to the gain value.

Steps S705 through S708 provide a method for automatically adjusting gain during the process of audio recording.

In some embodiments, outputting in real time, based on a first determination result, the audio signal picked up in real time by the microphone of the electronic device via the audio output apparatus connected to the electronic device in step S704 comprises: outputting in real time, based on the first determination result, the audio signal picked up in real time by the microphone of the electronic device via the external audio output apparatus connected to the electronic device, and prohibiting an internal audio output apparatus of the electronic device from outputting in real time the audio signal picked up in real time by the microphone.

In some embodiments, the method further comprises: prohibiting, based on a second determination result, an internal audio output apparatus of the electronic device from outputting in real time the audio signal picked up in real time by the microphone, wherein the second determination result indicates that the electronic device is not connected to an external audio output apparatus.

In some embodiments, in step S704, the external audio output apparatus comprises a microphone, and the outputting in real time, based on a first determination result, the audio signal picked up in real time by the microphone of the electronic device via the audio output apparatus connected to the electronic device comprises: outputting in real time, based on the first determination result, the audio signal picked up in real time by the microphone of the electronic device via the external audio output apparatus connected to the electronic device, and prohibiting an internal audio output apparatus of the electronic device from outputting in real time the audio signal picked up in real time by the microphone: and controlling to prohibit the microphone of the external audio output apparatus from picking up the audio signal.

Embodiment 8 will now be described.

Based on the above embodiments, this embodiment of the present disclosure provides an electronic device. The electronic device comprises a processor, an audio output apparatus and a microphone, wherein the processor is configured to: acquire a trigger instruction; in response to the trigger instruction, pick up in real time an audio signal by using a microphone of an electronic device; determine whether the electronic device is connected to an external audio output apparatus; and output in real time, based on a first determination result, the audio signal picked up in real time by the microphone of the electronic device via the audio output apparatus connected to the electronic device, wherein the first determination result indicates that the electronic device is connected to an external audio output apparatus.

In some embodiments, outputting in real time, based on a first determination result, the audio signal picked up in real time by the microphone of the electronic device via the audio output apparatus connected to the electronic device comprises: outputting in real time, based on the first determination result, the audio signal picked up in real time by the microphone of the electronic device via the external audio output apparatus connected to the electronic device, and prohibiting an internal audio output apparatus of the electronic device from outputting in real time the audio signal picked up in real time by the microphone.

In some embodiments, the processor is further configured to: prohibit, based on a second determination result, an internal audio output apparatus of the electronic device from outputting in real time the audio signal picked up in real time by the microphone, wherein the second determination result indicates that the electronic device is not connected to an external audio output apparatus.

In some embodiments, the external audio output apparatus comprises a microphone, and the outputting in real time, based on a first determination result, the audio signal picked up in real time by the microphone of the electronic device via the audio output apparatus connected to the electronic device comprises: outputting in real time, based on the first determination result, the audio signal picked up in real time by the microphone of the electronic device via the external audio output apparatus connected to the electronic device, and prohibiting an internal audio output apparatus of the electronic device from outputting in real time the audio signal picked up in real time by the microphone; and controlling to prohibit the microphone of the external audio output apparatus from picking up the audio signal.

It should be noted herein that description of the above electronic device embodiments is similar to the description of the above method embodiments, which achieves the same beneficial effects of the method embodiments, and is thus not described herein any further. With respect to the technical details not disclosed in the electronic device embodiments of the present disclosure, a person skilled in the art would reach full understanding with reference to the description of the method embodiments of the present disclosure. For brevity of description, such details are not described herein any further.

Embodiment 9 will now be described.

Based on the above embodiments, this embodiment of the present disclosure provides an electronic device, wherein the external audio output apparatus further comprises a control component, and the electronic device comprises a processor, an audio output apparatus and a microphone; wherein the processor is configured to: acquire a trigger instruction; in response to the trigger instruction, pick up in real time an audio signal by using a microphone of an electronic device; determine whether the electronic device is connected to an external audio output apparatus; and output in real time, based on a first determination result, the audio signal picked up in real time by the microphone of the electronic device via the audio output apparatus connected to the electronic device, wherein the first determination result indicates that the electronic device is connected to an external audio output apparatus; acquire a control signal generated by the control component of the external audio output apparatus; and in response to the control signal, control the process of picking up in real time the audio signal by using the microphone of the electronic device.

In some embodiments, the controlling the process of picking up in real time the audio signal by using the microphone of the electronic device comprises: performing gain adjustment on the process of picking up in real time the audio signal by using the microphone of the electronic device.

In some embodiments, in response to the control signal, controlling the process of picking up in real time the audio signal by using the microphone of the electronic device comprises: judging whether the control signal satisfies a first predetermined condition, wherein the first predetermined condition is a condition for making a time marker for the time when the microphone picks up the audio signal; and if the control signal satisfies the first predetermined condition, making a time marker for the time when the microphone picks up the audio signal.

In some embodiments, in response to the control signal, controlling the process of picking up in real time the audio signal by using the microphone of the electronic device comprises: determining execution instructions according to the control signal, wherein the execution instructions at least comprise an instruction for storing the audio signal picked up in real time by the microphone to a storage apparatus of the electronic device, an instruction for starting to control real-time pickup of the audio signal by the microphone, an instruction for pausing real-time pickup of the audio signal by the microphone, and an instruction for stopping real-time pickup of the audio signal by the microphone; and executing the instructions.

Embodiment 10 will now be described.

Based on the above embodiments, this embodiment of the present disclosure provides an electronic device, wherein the external audio output apparatus further comprises a control component, and the electronic device comprises a processor, an audio output apparatus and a microphone; wherein the processor is configured to: acquire a trigger instruction; in response to the trigger instruction, pick up in real time an audio signal by using a microphone of an electronic device; determine whether the electronic device is connected to an external audio output apparatus; output in real time, based on a first determination result, the audio signal picked up in real time by the microphone of the electronic device via the audio output apparatus connected to the electronic device, wherein the first determination result indicates that the electronic device is connected to an external audio output apparatus; acquire a parameter value of the audio signal picked up in real time by the microphone; judge whether the parameter value of the audio signal picked up in real time by the microphone satisfies a second predetermined condition to acquire a judgment result; determine a gain value according to the judgment result; and adjust a gain of the audio signal picked up in real time by the microphone according to the gain value.

In some embodiments, the external audio output apparatus may be an earphone.

It should be noted herein that description of the above electronic device embodiments is similar to the description of the above method embodiments, which achieves the same beneficial effects of the method embodiments, and is thus not described herein any further. With respect to the technical details not disclosed in the electronic device embodiments of the present disclosure, a person skilled in the art would reach full understanding with reference to the description of the method embodiments of the present disclosure. For brevity of description, such details are not described herein any further.

Embodiment 11 will now be described.

Based on the above embodiments, this embodiment of the present disclosure provides an audio recording apparatus. Various units included in the apparatus may all be implemented by the processor of the electronic device, or may be implemented by a specific logic circuit. In some embodiments, the processor may be a central processing unit (CPU), a micro processing unit (MPU), a digital signal processor (DSP) or a field programmable gate array (FPGA) or the like.

Figure 10:
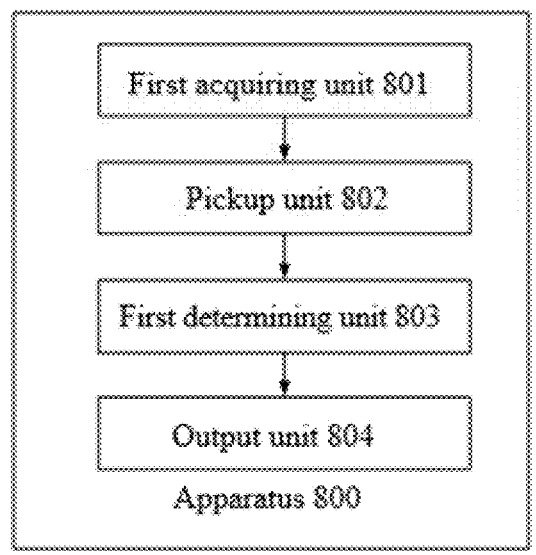
FIG. 10 is a schematic structural view of one embodiment of an audio recording apparatus.

FIG. 10 is a schematic structural diagram of an audio recording apparatus 800 according to Embodiment 11 of the present disclosure. As illustrated in FIG. 10, the apparatus 800 comprises a first acquiring unit 801, a pickup unit 802, a first determining unit 803 and an output unit 804.

The first acquiring unit 801 is configured to acquire a trigger instruction.

The pickup unit 802 is configured to, in response to the trigger instruction, pick up an audio signal in real time by using a microphone of an electronic device.

The first determining unit 803 is configured to determine whether the electronic device is connected to an external audio output apparatus.

The output unit 804 is configured to output in real time, based on a first determination result, the audio signal picked up in real time by the microphone of the electronic device via the audio output apparatus connected to the electronic device, wherein the first determination result indicates that the electronic device is connected to an external audio output apparatus.

In some embodiments, the output unit is configured to output in real time, based on the first determination result, the audio signal picked up in real time by the microphone of the electronic device via the external audio output apparatus connected to the electronic device, and prohibit an internal audio output apparatus of the electronic device from outputting in real time the audio signal picked up in real time by the microphone.

In some embodiments, the output unit is further configured to: prohibit, based on a second determination result, an internal audio output apparatus of the electronic device from outputting in real time the audio signal picked up in real time by the microphone, wherein the second determination result indicates that the electronic device is not connected to an external audio output apparatus.

In some embodiments, the external audio output apparatus comprises a microphone, and the output unit is configured to, output in real time, based on the first determination result, the audio signal picked up in real time by the microphone of the electronic device via the external audio output apparatus connected to the electronic device, and prohibit an internal audio output apparatus of the electronic device from outputting in real time the audio signal picked up in real time by the microphone.

In some embodiments, the apparatus further comprises a first control unit, configured to control to prohibit the microphone of the external audio output apparatus from picking up the audio signal.

It should be noted herein that description of the above apparatus embodiments is similar to the description of the above method embodiments, which achieves the same beneficial effects of the method embodiments, and is thus not described herein any further. With respect to the technical details not disclosed in the apparatus embodiments of the present disclosure, a person skilled in the art would reach full understanding with reference to the description of the method embodiments of the present disclosure. For brevity of description, such details are not described herein any further.

Embodiment 12 will now be described.

Based on the above embodiments, this embodiment of the present disclosure provides an audio recording apparatus. In this embodiment, the external audio output apparatus further comprises a control component. Various units included in the apparatus and various modules included in the units may all be implemented by the processor of the electronic device, or may be implemented by a specific logic circuit. During the specific implementation process of the embodiments, the processor may be a central processing unit (CPU), a micro processing unit (MPU), a digital signal processor (DSP) or a field programmable gate array (FPGA) or the like.

Figure 11:
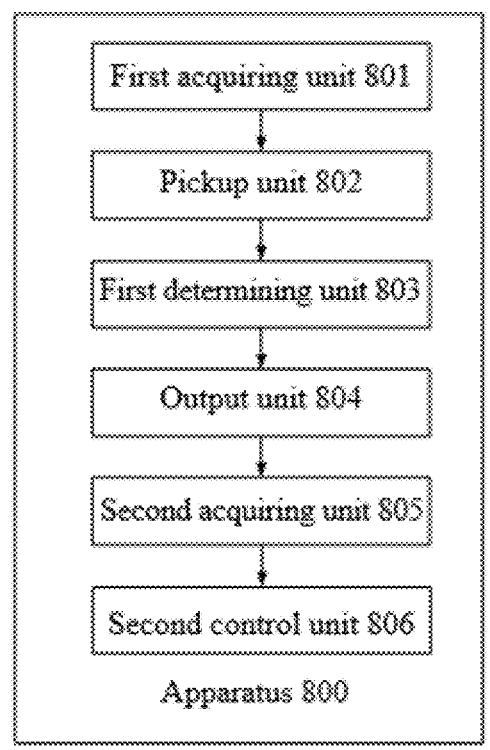
FIG. 11 is a schematic structural view of one embodiment of an audio recording apparatus.

FIG. 11 is a schematic structural diagram of an audio recording apparatus 800 according to Embodiment 12 of the present disclosure. As illustrated in FIG. 11, the apparatus 800 comprises a first acquiring unit 801, a pickup unit 802, a first determining unit 803, an output unit 804, a second acquiring unit 805 and a second control unit 806.

The first acquiring unit 801 is configured to acquire a trigger instruction.

The pickup unit 802 is configured to, in response to the trigger instruction, pick up in real time an audio signal by using a microphone of an electronic device.

The first determining unit 803 is configured to determine whether the electronic device is connected to an external audio output apparatus.

The output unit 804 is configured to output in real time, based on a first determination result, the audio signal picked up in real time by the microphone of the electronic device via the audio output apparatus connected to the electronic device, wherein the first determination result indicates that the electronic device is connected to an external audio output apparatus.

The second acquiring unit 805 is configured to acquire control signals generated by the control component of the external audio output apparatus.

The second control unit 806 is configured to, in response to the control signal, control the process of picking up in real time the audio signal by using the microphone of the electronic device.

In some embodiments, the second control unit is configured to, in response to the control signal, perform gain adjustment for the process of picking up in real time the audio signal by using the microphone of the electronic device.

In some embodiments, the second control unit comprises a judging module and a marking module.

The judging module is configured to judge whether the control signal satisfies a first predetermined condition, wherein the first predetermined condition is a condition for making a time marker for the time when the microphone picks up the audio signal.

The marking module is configured to, if the control signal satisfies the first predetermined condition, make a time marker for the time when the microphone picks up the audio signal.

In some embodiments, the second control unit further comprises a determining module and an executing module.

The determining module is configured to determine execution instructions according to the control signal, wherein the execution instructions at least comprise an instruction for storing the audio signal picked up in real time by the microphone to a storage apparatus of the electronic device, an instruction for starting to control real-time pickup of the audio signal by the microphone, an instruction for pausing real-time pickup of the audio signal by the microphone, and an instruction for stopping real-time pickup of the audio signal by the microphone.

The executing module is configured to execute the executions.

It should be noted herein that description of the above apparatus embodiments is similar to the description of the above method embodiments, which achieves the same beneficial effects of the method embodiments, and is thus not described herein any further. With respect to the technical details not disclosed in the apparatus embodiments of the present disclosure, a person skilled in the art would reach full understanding with reference to the description of the method embodiments of the present disclosure. For brevity of description, such details are not described herein any further.

Embodiment 13 will now be described.

Based on the above embodiments, this embodiment of the present disclosure provides an audio recording apparatus. In some embodiments, the external audio output apparatus further comprises a control component. Various units included in the apparatus may all be implemented by the processor of the electronic device, or may be implemented by a specific logic circuit. During the specific implementation process of the embodiments, the processor may be a central processing unit (CPU), a micro processing unit (MPU), a digital signal processor (DSP) or a field programmable gate array (FPGA) or the like.

Figure 12:
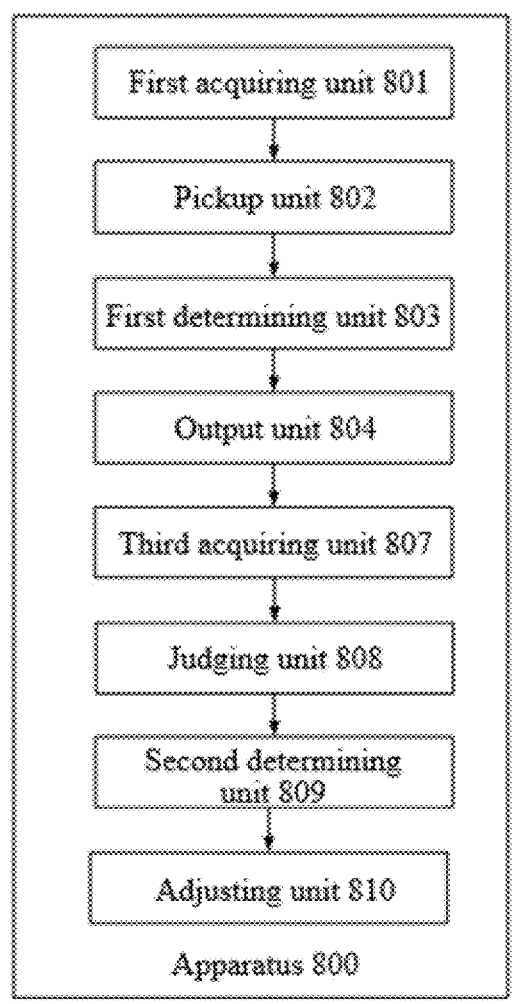
FIG. 12 is a schematic structural view of an audio recording apparatus according to Embodiment 13 of the present disclosure.

FIG. 12 is a schematic structural diagram of an audio recording apparatus 800 according to Embodiment 13 of the present disclosure. As illustrated in FIG. 12, the apparatus 800 comprises a first acquiring unit 801, a pickup unit 802, a first determining unit 803, an output unit 804, a third acquiring unit 807, a judging unit 808, a second determining unit 809 and an adjusting unit 810.

The first acquiring unit 801 is configured to acquire a trigger instruction.

The pickup unit 802 is configured to, in response to the trigger instruction, pick up in real time an audio signal by using a microphone of an electronic device.

The first determining unit 803 is configured to determine whether the electronic device is connected to an external audio output apparatus.

The output unit 804 is configured to output in real time, based on a first determination result, the audio signal picked up in real time by the microphone of the electronic device via the audio output apparatus connected to the electronic device, wherein the first determination result indicates that the electronic device is connected to an external audio output apparatus.

The third acquiring unit 807 is configured to acquire a parameter value of the audio signal picked up in real time by the microphone.

The judging unit 808 is configured to judge whether the parameter value of the audio signal picked up in real time by the microphone satisfies a second predetermined condition to acquire a judgment result.

The second determining unit 809 is configured to determine a gain value according to the judgment result.

The adjusting unit 810 is configured to adjust a gain of the audio signal picked up by the microphone according to the gain value.

In some embodiments, the external audio output apparatus is an earphone.

It should be noted herein that description of the above apparatus embodiments is similar to the description of the above method embodiments, which achieves the same beneficial effects of the method embodiments, and is thus not described herein any further. With respect to the technical details not disclosed in the apparatus embodiments of the present disclosure, a person skilled in the art would reach full understanding with reference to the description of the method embodiments of the present disclosure. For brevity of description, such details are not described herein any further.

It should be understood that the phrase "one embodiment" or "an embodiment" referenced in this specification signifies that particular characteristics, structures, or features may be combined in at least one embodiment consistent with this disclosure. Therefore, the appearances of the phrase "in one embodiment" or "in an embodiment" in this specification do not necessarily refer to the same embodiment. In addition, the described characteristics, structures, or features may be incorporated in one or more embodiments in any suitable manner. It should be understood that in various embodiments of the present disclosure, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present disclosure. The sequence numbers of the embodiments of the present disclosure are only for ease of description, but do not denote the preference of the embodiments.

It should be noted that, in this specification, terms "comprises", "comprising", "has", "having", "includes", "including", "contains", "containing" or any other variation thereof, are intended to cover a non-exclusive inclusion, such that a process, method, article, or apparatus, that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus.

In the several embodiments provided in the present disclosure, it should be understood that the disclosed device and method may be practiced in other manners. The above described device embodiments are merely illustrative. For example, the unit division herein is merely logical function division and may be other divisions in actual practice. For example, multiple units or components may be combined or integrated into another system, or some features can be ignored or not performed. In addition, the displayed or discussed mutual couplings or direct couplings or communication connections of the various constitutional parts are practiced through some interfaces. The indirect couplings or communication connections between the devices or units may be practiced in electronic, mechanical or other forms.

The units used as separate components may or may not be physically independent of each other. The element illustrated as a unit may or may not be a physical unit, that is, it may be either located at one position or deployed on a plurality of network units. A part or all of the units may be selected according to the actual needs to achieve the objectives of the solutions of the embodiments.

In addition, the functional units in the various embodiments of the present disclosure may be integrated in one processing unit, or may separately and physically exist as a single unit, or two or more units may be integrated in one unit. The integrated unit may be practiced through hardware, or may also be practiced in a form of hardware plus a software functional unit.

Persons of ordinary skill in the art may understand that all or part of steps according to the method embodiments of the present disclosure may be executed by a program instructing relevant hardware. The programs may be stored in a computer readable storage medium. When the programs are executed, the steps of the method in the embodiment are executed. The storage medium includes various mediums, such as a mobile storage device, a read-only memory (ROM), a magnetic disk, a compact disc read-only memory (CD-ROM) or the like medium which is capable of storing program code.

Alternatively, the integrated unit according to the present disclosure, if implemented in the form of a software functional unit and sold or used as a separate product, may be stored in a computer-readable storage medium. Based on this understanding, the technical solutions or part of the technical solutions disclosed in the present disclosure that makes contributions to the prior art may be essentially embodied in the form of a software product. The software product may be stored in a storage medium. The software product includes a number of instructions that enable a computer (a PC, a server, a network device, or the like) device to execute all or a part of the steps of the methods provided in the embodiments of the present disclosure. The storage medium comprises: a mobile storage device, a ROM, a magnetic disk, a CR-ROM or the like medium which is capable of storing program code.

The above embodiments are used only for illustrating the present disclosure, but are not intended to limit the protection scope of the present disclosure. Various modifications and replacements readily derived by those skilled in the art within technical disclosure of the present disclosure shall fall within the protection scope of the present disclosure. Therefore, the protection scope of the present disclosure is subject to the claims.

What is claimed is:

1. A method, comprising
acquiring a trigger instruction;
picking up an audio signal with a microphone of an electronic device in response to acquiring the trigger instruction;
determining whether the electronic device is connected to an external audio output apparatus;
outputting the audio signal in real time via the external audio output apparatus based on a first determination result;
performing analog input gain adjustment on the microphone of the electronic device via the external audio output apparatus; and
recording the audio signal;
wherein
the first determination result indicates that the electronic device is connected to the external audio output apparatus.

2. The method of claim 1, wherein outputting the audio signal in real time via the external audio output apparatus based on a first determination result comprises
prohibiting an internal audio output apparatus of the electronic device from outputting the audio signal in real time.

3. The method of claim 1, further comprising
prohibiting an internal audio output apparatus of the electronic device from outputting the audio signal in real time based on a second determination result;
wherein the second determination result indicates that the electronic device is not connected to the external audio output apparatus.

4. The method of claim 1, wherein
the external audio output apparatus comprises a microphone; and
outputting the audio signal in real time via the external audio output apparatus based on a first determination result comprises:
outputting the audio signal in real time via the external audio output apparatus based on a first determination result,
prohibiting an internal audio output apparatus of the electronic device from outputting the audio signal, and
prohibiting the microphone of the external audio output apparatus from picking up the audio signal.

5. The method of claim 1, further comprising
acquiring a control signal generated by a control component of the external audio output apparatus;
determining whether the control signal satisfies a first predetermined condition; and
creating a marker if the control signal satisfies the first predetermined condition.

6. The method of claim 1, further comprising
acquiring a control signal generated by a control component of the external audio output apparatus;
determining execution instructions of the control signal; and
executing the execution instructions.

7. The method of claim 6, wherein the execution instructions comprise
an instruction for starting pickup of the audio signal,
an instruction for pausing pickup of the audio signal,
an instruction for stopping real-time pickup of the audio signal by the microphone, and
an instruction for storing the audio signal picked up in real time by the microphone to a storage apparatus of the electronic device.

8. The method of claim 1, wherein the method further comprises
acquiring a parameter value of the audio signal;
determining whether the parameter value of the audio signal satisfies a second predetermined condition;
acquiring a parameter determination result if the parameter value of the audio signal satisfies the second predetermined condition;
determining a gain value of the parameter determination result; and
adjusting a gain parameter of the audio signal based on the gain value.

9. An apparatus, comprising
a processor;
an external audio output apparatus;
a microphone; and
a storage apparatus;
wherein the processor
acquires a trigger instruction,
picks up an audio signal with the microphone in response to acquiring the trigger instruction,
determines whether the apparatus is connected to the external audio output apparatus,
outputs the audio signal in real time via the external audio output apparatus based on a first determination result,
performs analog input gain adjustment on the microphone via the external audio output apparatus, and
records the audio signal to the storage apparatus;
wherein the first determination result indicates that the apparatus is connected to the external audio output apparatus.

10. The apparatus of claim 9, further comprising
an internal audio output apparatus;
wherein the processor prohibits the internal audio output apparatus from outputting the audio signal.

11. The apparatus of claim 9, wherein
the processer prohibits the internal audio output apparatus from outputting the audio signal based on a second determination result; and the second determination result indicates that the electronic device is not connected to the external audio output apparatus.

12. The apparatus of claim 9, wherein the external audio output apparatus comprises a microphone; and the processor prohibits the microphone of the external audio output apparatus from picking up the audio signal.

13. The apparatus of claim 9, wherein the external audio output apparatus comprises a control component; and the processor acquires a control signal generated by the control component, determines whether the control signal satisfies a first predetermined condition, and creates a time marker if the control signal satisfies the first predetermined condition.

14. The apparatus of claim 9, wherein the external audio output apparatus comprises a control component; and the processor acquires a control signal generated by the control component, determines execution instructions of the control signal, and executes the execution instructions;

wherein the execution instructions comprise an instruction for starting pickup of the audio signal, an instruction for pausing pickup of the audio signal, an instruction for stopping real-time pickup of the audio signal by the microphone, and an instruction for storing the audio signal picked up in real time by the microphone to the storage apparatus of the electronic device.

15. The apparatus of claim 9, wherein the processor acquires a parameter value of the audio signal;

determines whether the parameter value of the audio signal satisfies a second predetermined condition;

acquires a judgment result if the parameter value of the audio signal satisfies the second predetermined condition;

determines a gain value of the judgment result; and adjusts a gain parameter of the audio signal based on the gain value.

* * * * *